(12) United States Patent
Gabrail et al.

(10) Patent No.: US 8,678,930 B2
(45) Date of Patent: Mar. 25, 2014

(54) FANTASY LEAGUE MANAGEMENT

(75) Inventors: Paul Gabrail, Richfield, OH (US);
Andrew Strigle, Macedonia, OH (US);
Benjamin Murphy, Canal Fulton, OH (US)

(73) Assignee: Front Office Media LLC, Richfield, OH (US)

( * ) Notice: Subject to any disclaimer, the term of this patent is extended or adjusted under 35 U.S.C. 154(b) by 0 days.

(21) Appl. No.: 13/224,870

(22) Filed: Sep. 2, 2011

(65) Prior Publication Data
US 2013/0060361 A1    Mar. 7, 2013

(51) Int. Cl.
*A63F 13/00* (2006.01)
(52) U.S. Cl.
USPC .............. 463/42; 463/1; 463/2; 463/3; 463/4; 463/5; 463/9; 463/10; 463/25
(58) Field of Classification Search
USPC ........... 463/1–5, 9, 10, 25, 39–43; 700/91–93
See application file for complete search history.

(56) References Cited

U.S. PATENT DOCUMENTS

| | | | | |
|---|---|---|---|---|
| 6,371,855 | B1 * | 4/2002 | Gavriloff | 463/42 |
| 7,699,707 | B2 * | 4/2010 | Bahou | 463/42 |
| 8,027,899 | B2 * | 9/2011 | Asher et al. | 705/36 R |
| 8,192,260 | B2 * | 6/2012 | Fleming | 463/1 |
| 2006/0105827 | A1 * | 5/2006 | Metzger et al. | 463/9 |
| 2009/0325685 | A1 * | 12/2009 | Webb et al. | 463/25 |

\* cited by examiner

*Primary Examiner* — Sunit Pandya
(74) *Attorney, Agent, or Firm* — Cooper Legal Group LLC

(57) ABSTRACT

One or more techniques and/or systems for managing a fantasy league are disclosed to incorporate one or more reality factors, equity lines, luxury tax, and/or revenue sharing policies into administration of the fantasy league. A reality factor may influence real life scenarios between at least one of a real player, a real team, and/or a real league, for example. Accordingly, the reality factor may be applied to at least one of a corresponding fantasy player, fantasy team, and/or fantasy league to create a fantasy rule configured to enable a fantasy environment (e.g., the fantasy player, fantasy team, fantasy league, and/or relationships thereof) to more closely emulate the real player, real team, real league, and/or corresponding relationships.

20 Claims, 12 Drawing Sheets

FANTASY LEAGUE MANAGEMENT

BACKGROUND

In a fantasy league, participants (e.g., fantasy team owners) may build a fantasy team that competes against other fantasy teams of other fantasy team owners. Participants generally have control over aspects a real general manager and/or a real coach of a real team would otherwise manage. For example, fantasy team owners may manage lineups of fantasy players, draft, trade, cut, sign, add, drop, start, and/or bench fantasy players similarly as real managers would. Fantasy team owners may participate in a fantasy draft where respective fantasy teams acquire fantasy players which correspond to real players on real teams in real leagues (e.g., professional sporting leagues). Typically, fantasy team rosters may be reset between seasons, although keeper leagues may allow for retention of at least some fantasy players from season to season. That is, at an end of a fantasy season, fantasy teams may clear their rosters prior to an upcoming draft and/or permit fantasy team owners to retain at least some fantasy players from a fantasy roster for the next season (e.g., a keeper league). Generally, a keeper league draft may comprise rookies, previously undrafted fantasy players, and dropped fantasy players, while drafts for other fantasy leagues may begin a draft with at least a majority of real players from the real league.

Typically, an outcome of a fantasy league may be based on fantasy players belonging to fantasy teams in the fantasy league and on statistics related to performances of real players corresponding to fantasy players on respective fantasy teams. For example, merely fantasy players designated to start on a roster may 'score' points for a fantasy team. For example, a fantasy team may be matched up against other fantasy team opponents (e.g., from a fantasy league) on a weekly basis and points may be awarded using a point scoring system or according to scoring categories (e.g., touchdowns, yards, home runs, hits, earned run average, points, assists, etc.). As an example, a touchdown may be worth six points, while increments of thirty passing yards may be worth one point, and increments of twenty rushing and/or receiving yards may be worth one point, etc. Some fantasy leagues may track win-loss records for head to head matchups between fantasy teams, while other leagues may track total points to rank fantasy teams according to an ongoing point tally, for example.

While current fantasy leagues account for on field performance of real players, these fantasy leagues are not believed to consider other realities associated with managing a real team. For example, head to head fantasy leagues generally do not promote a realistic fantasy payroll as part of head to head fantasy league play. That is, an owner of a fantasy team may merely manage the fantasy team from a coaching and/or drafting perspective, without regard to finances, payroll of players, contractual agreements, or league policies, for example.

SUMMARY

This Summary is provided to introduce a selection of concepts in a simplified form which are further described below in the Detailed Description. This Summary is not intended to identify key factors or essential features of the claimed subject matter, nor is it intended to be used to limit the scope of the claimed subject matter.

One or more techniques and/or systems for managing a fantasy league are disclosed to promote one or more reality factors during a match(s) and/or administration of the fantasy league. The reality factor(s) may comprise data related to real life sources relating to economic, contractual, legal, political, and/or other factors which may affect the real player, real team, real league and/or relationships thereof. Accordingly, the reality factor may be applied to the fantasy league such that the fantasy league and/or environment more closely emulate the real league. In one exemplary embodiment, the reality factor may comprise a performance bonus for a real player, to be paid to the real player by a real team to which the real player belongs, upon the real player achieving a pre-determined performance (e.g., throwing ten touchdowns, winning a playoff game, making an All-Star Team, etc.). To this end, a reality factor comprising the performance bonus may be applied to a corresponding fantasy player (e.g., a fantasy quarterback) on a fantasy team to create a fantasy rule configured to deduct a corresponding fantasy performance bonus from a fantasy payroll for the fantasy team upon the real quarterback completing the pre-determined performance. Other reality factors that may be applied to a fantasy player, team, and/or league may comprise, among other things, trade restrictions, luxury payrolls taxes, It will be appreciated that the reality factor, and/or application of the reality factor to create a fantasy rule may be scaled to facilitate implementation within the fantasy league. Thus, with regard to the fantasy luxury payroll tax, the fantasy league may implement a salary cap (e.g., which may be scaled) different than an actual salary cap of the real league, depending on a number of fantasy teams within a fantasy league, for example. Alternatively, the fantasy league may mirror the luxury payroll tax policy of the real league, and follow a fantasy rule substantially similar to the actual salary cap and/or luxury tax of the real league.

In one embodiment for management of a fantasy league, a fantasy payroll and fantasy equity line may be provided such that a fantasy team owner may draft, trade for, and/or acquire fantasy players (e.g., by way of waiver wire) until the fantasy payroll is exhausted. For example, fantasy team owners may begin a season with an initial fantasy payroll, and draft fantasy players according to minimum contract obligations and/or maximum contract obligations owed to the real player. However, since contracts for the real player may be based on performance (e.g., by performance bonuses, production statistics, whether or not the real player makes the playoffs, an All Star Team, etc.), a value for the contract may be unknown at a time when a fantasy team acquires a fantasy player and/or until a season is over. To this end, incorporating reality factors in fantasy leagues enables a contract value for a respective player to fluctuate throughout a fantasy season similar to that of a real contract value. Therefore, it may be possible for a fantasy team owner to owe fantasy players additional money (e.g., performance bonuses, endorsements, etc.) as a season progresses. To this end, a fantasy equity line may provide a fantasy team owner with an increase to a fantasy payroll in a scenario where the allocated fantasy payroll is exceeded. Further, the fantasy equity line may be available before (e.g., during a fantasy draft or prior to actual play), during (e.g., due to performance bonuses to paid to fantasy players), and/or after (e.g., for offseason trades) the fantasy season. For example, if a fantasy team spends at least a majority of fantasy payroll during the draft, but desires to continue drafting additional players, a fantasy equity line may extend a loan to the fantasy team in exchange for repayment at an interest rate. In this way, the fantasy team may draft the additional player, but may be charged with repaying a loan and additional interest, for example. In one example, if a fantasy team exhausts a fantasy payroll of one hundred million, the fantasy team may draft an additional player (e.g., with a corresponding ten million dollar salary) by taking a ten million dollar loan through the fantasy equity line. In this example, the fantasy equity line may be configured to setup a repayment plan for the fantasy team comprising ten monthly one million dollar payments, at a five percent interest rate compounded monthly. In another example, a fantasy team may merely use a fantasy payroll provided during an initial draft for fantasy players (e.g., spending an amount of a provided fantasy payroll such that zero fantasy payroll remains), and invoke the fantasy equity line upon one of the fantasy players on the fantasy team achieving a performance bonus (e.g., opening the fantasy equity line due to a new monetary obligation created by a performance bonus clause in a contract for the real player, where a reality factor comprises the real performance bonus clause). Additionally, aspects pertaining to the equity line may be used for scoring head to head matches between fantasy teams and/or overall performance of a fantasy team within the fantasy league. For example, one of the scoring categories may comprise a comparison between two fantasy teams to determine a team associated with borrowing less equity (e.g., the team which borrowed less money may be awarded a point in an equity scoring category). Therefore, it is believed that the equity line promotes an economic aspect of fantasy league management, for example.

According to one aspect, social media actions relating to a fantasy team owner and/or a fantasy team may be used to adjust a fantasy payroll and/or a fantasy equity line. That is, for example, if a fantasy team owner creates a social media page corresponding to the fantasy team, the fantasy team owner may be rewarded with an increase to the fantasy payroll and/or equity line for creating the social media page. As another example, the fantasy team owner may be rewarded (e.g., by way of a fantasy payroll increase, fantasy equity line increase, and/or a fantasy interest rate decrease) when other social media users act in a manner related to e.g., the fantasy team (e.g., via microblogs, blogs, posts, likes, status updates, etc.).

In one embodiment, achievements and/or prizes may be awarded to fantasy team owners and/or fantasy teams for accomplishing feats within the fantasy league. For example, a winner of a fantasy league may receive a fantasy team logo which may appear as an icon and/or an avatar on a homepage for the fantasy team and/or social media pages related to the fantasy team. A fantasy team owner could purchase merchandise bearing the fantasy team logo, for example. Achievements related to reality factors may be awarded for fantasy team owners who obtain a fantasy win streak, break a fantasy win streak of another fantasy team owner, achieve a win to fantasy payroll spent ratio, earn the most net profit, acquire players corresponding to a best fantasy point production to contract cost ratios, and/or make the most efficient trades.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

The application is illustrated by way of example and not limitation in the figures of the accompanying drawings, in which like references indicate similar elements and in which.

DETAILED DESCRIPTION

Figure 1:
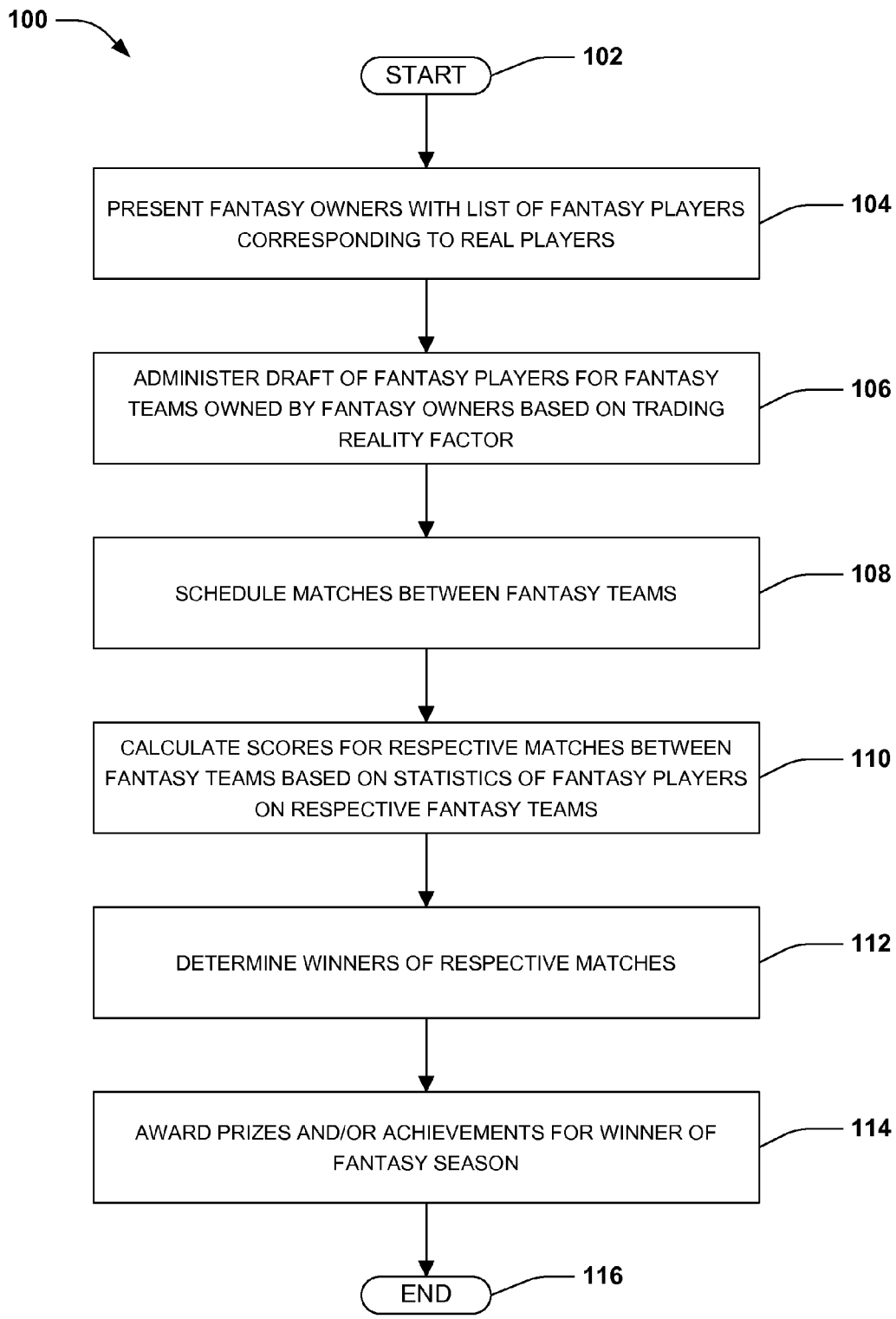
FIG. 1 is a flow diagram of an exemplary method for managing a fantasy league.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

One or more techniques and/or systems for managing a fantasy league are provided herein. For example, one or more reality factors related to a real player, a real team, and/or a real league may be received and applied to a fantasy player, a fantasy team, and/or a fantasy league. The reality factor(s) may comprise, but are not limited to, economic, political, legal, and/or policy oriented aspects commonly associated with real players, real teams, and/or real leagues. For example, if a real player signs a contract with a no trade clause, a real team to which the real player belongs may not trade the real player to another real team without consent from the real player. Applying the no trade reality factor to a fantasy environment (e.g., at least one of a fantasy player, fantasy team, fantasy league, and/or relationships thereof) may create a fantasy rule which provides that the fantasy player corresponding to the real player may be at least one of untradeable and/or inhibited from trade. Moreover, in one embodiment, using the techniques described herein, a fantasy rule based upon the no trade reality factor may optionally penalize fantasy team owners who participate in a trade involving the corresponding fantasy player.

FIG. 1 is a flow diagram of an exemplary method 100 for managing a fantasy league. The exemplary method 100 begins at 102 and presents a fantasy team owner (e.g., participant) with a set of fantasy players (e.g., which correspond to real players) available to be drafted at 104. In one embodiment, the presented of players 104 may be pre-sorted (e.g., ordered) according to one or more factors (e.g., a theoretical fantasy rank of the fantasy player, previous fantasy season rank, production statistics, point statistics, salary, signing bonus, minimum contract value, maximum contract value, no trade clause, guaranteed money clause, player impact, contract length, etc.) related to fantasy league management, for example. In one embodiment, the fantasy team owner may rearrange the presented set 104 to create a customized order reflecting a desired draft order for the fantasy team owner. Further, a notice may be issued to the fantasy team owner indicative of one or more draft deficiencies with the customized order (e.g., alerting the fantasy team owner that he/she may be setup to draft too many players for a skill position and/or too few players to fill another skill position). For example, if a roster merely comprises two quarterback slots, the fantasy team owner may be alerted when the customized order is configured to draft a third quarterback for the fantasy team while slots for other positions may be unfilled.

At 106 in the example method 100, a draft may be administered to distribute fantasy players to fantasy teams. It will be appreciated that the draft may be automatic (e.g., based on the set presented at 104 and/or the customized order) and/or live, enabling the fantasy team owner to make adjustments to picks in real time. Generally, a fantasy league is comprised of a plurality of fantasy team owners (e.g., participants) and respective fantasy team owners take turns drafting players using a serpentine ordering (e.g., a fantasy team owner who picks first in an odd round may be setup to pick last in an even round, etc.). However, other techniques for determining an order for the draft are also contemplated herein (e.g., such as a lottery system). In one embodiment, fantasy team owners may trade fantasy draft picks and/or fantasy players prior to, during, and/or after the fantasy draft based on one or more trading reality factors. For example, if a first team drafts a top fantasy player and has no fantasy draft picks remaining and a second team drafts an average fantasy player and has a fantasy draft pick remaining, the first team may trade the top fantasy player to the second team for the average fantasy player and the remaining fantasy draft pick. In one embodiment, a fantasy team owner may trade for future fantasy draft picks (e.g., during a season after an initial draft has concluded, during a fantasy draft, etc.). In another embodiment, a fantasy team owner may trade a portion of their fantasy payroll (e.g., play money) in exchange for fantasy draft picks and/or fantasy players. For example, a first fantasy team may buy a fantasy draft pick and/or a fantasy player from a second fantasy team using at least a portion of the fantasy payroll of the first fantasy team. In this way, the ability to freely trade fantasy draft picks, fantasy players, and/or fantasy payroll may be promoted based on a reality factor indicative of trading policies and/or a trade protocol of a real league. Accordingly, trades which may be possible in the real league may be enabled in the fantasy league as well, based on one or more trading reality factors, for example.

At 108 in the exemplary method 100, matches may be scheduled between fantasy teams such that a first fantasy team is scheduled to meet head to head with one or more other fantasy teams, for example. In one embodiment, various head to head categories may be provided, and respective fantasy teams may compete to win respective categories and score points. To this end, points for scoring categories may be summed (e.g., a team winning more categories may be declared a winner of a head to head matchup) to determine a winner for a match, for example. In one embodiment, fantasy teams may be awarded points based on statistics (e.g., six points for a touchdown) related to players on respective fantasy teams, and a winner of a match may be chosen based on a point total rather than by scoring categories.

At 110, scores for respective matches between fantasy teams may be calculated based on statistics for respective fantasy players on respective fantasy teams. For example, one scoring category may comprise a collective player salary configured to compare collective fantasy player salaries from fantasy teams to determine a team with a lower fantasy payroll (e.g., the team with the lower fantasy payroll may be awarded a point in the collective player salary scoring category). In one embodiment, if a point total scoring system is used, a number of points may be subtracted from a point total of a fantasy team based on an amount of debt (e.g., fantasy payroll spent, fantasy equity incurred by the fantasy team, etc.), for example. In another embodiment, the number of points subtracted may be tiered based on an amount of debt (e.g., minus one point for one to ten million of debt, minus five points for ten to twenty million of debt, etc.). It will be appreciated that fantasy payroll spent may be treated differently (e.g., more or less favorably) than fantasy equity incurred, at least because fantasy equity may be associated with fantasy interest, for example.

Continuing with exemplary method 100, winners of respective matches may be determined at 112 in the example method 100. For example, in a head to head matchup, the winner may be determined based on a fantasy team winning more categories than another fantasy team. To this end, fantasy teams may accumulate a fantasy record as a fantasy season progresses.

Prizes and/or achievements may be awarded to winners throughout and/or at a conclusion of the fantasy season at 114 in the example method 100. As an example, a fantasy team winning a fantasy season (e.g., a fantasy champion) may receive a customized logo with a corresponding fantasy team emblem. That is, for example, members (e.g., fantasy team owners) of the fantasy league may be presented with the customized logo of the fantasy team when viewing pages related to the winning team, for example. Similarly, a fantasy team owner may receive an achievement for an efficient trade and be rewarded with an icon to be displayed next to a corresponding fantasy player acquired by the efficient trade. To this end, rewards may comprise an increase in fantasy payroll, an additional roster spot, and/or additional draft picks for an upcoming draft, for example. The exemplary method 100 ends at 116 thereafter.

Figure 2:
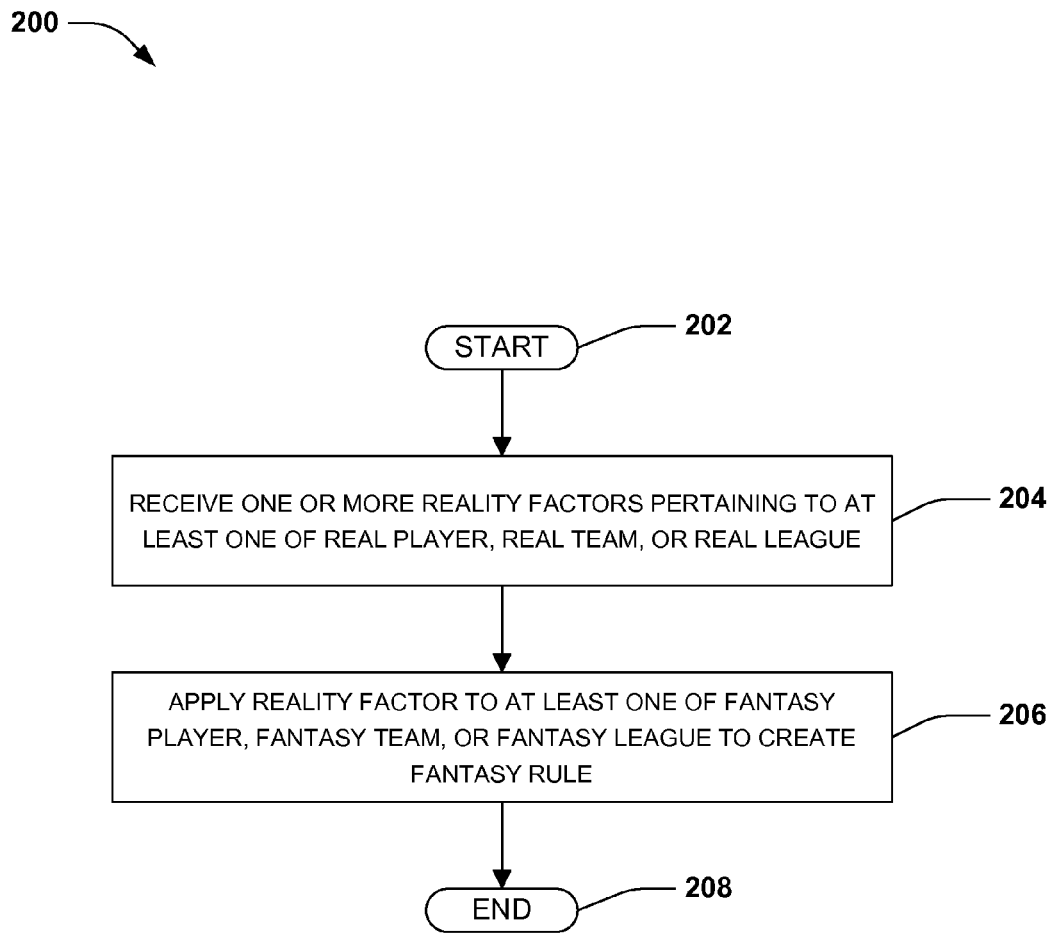
FIG. 2 is a flow diagram illustrating an example method where one or more techniques described herein may be implemented.

FIG. 2 is a flow diagram illustrating one embodiment 200 of one or more portions of a method for implementing a reality factor and/or creation of a fantasy rule. The exemplary method 200 begins at 202 and one or more reality factors pertaining to at least one of a real player, a real team, and/or a real league may be received 204. The received one or more reality factors may relate to, but are not limited to economic, contractual, legal, political, and/or other factors (e.g., considerations) which affect at least one of a real player, real team, and/or real league. Such factors may be derived from available contracts, news articles, real league information (e.g., information from real professional sport leagues), and/or other sources of information related to real players, real teams, and/or real leagues, for example.

At 206 in the example method 200, the received one or more reality factors are applied to at least one of a fantasy player, fantasy team, and fantasy league to create a fantasy rule. It will be appreciated that an application of the fantasy rule may depend at least in part upon whether the received factor pertains to a real player, a real team, and/or a real league. For example, a reality factor that merely pertains to a real player (e.g., as opposed to a real team and/or a real league) may be applied to a corresponding fantasy player. However, at least some reality factors may not be applicable in a fantasy game without at least some variation in the fantasy rule (e.g., relative to the reality factor (e.g., real contractual agreement). For example, in professional sports, a real player who becomes a free agent may have the option to select his/her team. However, in a fantasy league, fantasy players typically do not have such discretion (e.g., the fantasy team owners choose their respective fantasy players through a draft, trade, etc.). Therefore, the reality factor (e.g., the free-agency contractual obligation) may be adapted to be more applicable to a fantasy league. Moreover, a fantasy team generally comprises fantasy players that correspond to real players on numerous teams (e.g., such that there isn't a direct correlation between a real team and a fantasy team). Thus, for these reason and others, it will be appreciated that at least some reality factors (e.g., such as some real rules, contractual obligations, etc.) may not be directly applied in the fantasy league. Rather, the fantasy rule created at 206 may be an adaptation of the received reality factor, for example. That is, in one embodiment, one or more fantasy rules created at 206 may be merely loosely based upon the received reality factor, for example, as opposed to a direct application of the received reality factor.

Paragraphs [0035] through [0044] of the instant disclosure provide several examples of reality factors that may be received at 204 and an application of the received reality factors to create rules at 206. It will be appreciated to those skilled in the art that the reality factors described herein and/or the fantasy rules derived therefrom are merely example factors that may be received at 204 and/or fantasy rules derived therefrom that may be applied to a fantasy player, fantasy team, and/or fantasy league at 206. Such examples are not intended to be a comprehensive list of all such reality factors and/or fantasy rules.

One example of a reality factor that may be received at 204 may be indicative of a trade protocol for a real league. To this end, if a trade may be feasible in the real league (e.g., based on the trade protocol), a fantasy rule may be created at 206 indicative of this reality factor. For example, if the trade protocol enables draft picks, real players, and/or real payroll to be traded before, during, and/or after a draft, a fantasy rule may be created to enable trading of fantasy players, fantasy picks and/or fantasy payroll before, during, and/or after a fantasy draft.

As another example, the received reality factor(s) may comprise a contract expiration date for a real player. Accordingly, a fantasy rule may be created at 206 to initiate a release of a fantasy player corresponding to the real player whose contract has an expiration date and/or may create a fantasy rule that provides for the release of fantasy players as respective real players with whom the fantasy players correspond are released from their respective contracts. It will be appreciated that the fantasy rule created at 206 may deviate from aspects of the received reality factor (e.g., in scenarios where application of the reality factor may not correspond in a one-to-one manner from the real league to the fantasy league). For example, when a contract for a real player expires, the real player may become a free agent and sign with a real team based on various factors (e.g., hometown, location, highest bidder, best opportunity to win a championship for the real player, etc.). Because some of these aspects may not come into play in a fantasy league, fantasy players released from respective fantasy teams due to contract expiration may instead be placed in a fantasy draft for an upcoming season based on the corresponding fantasy rule created at 206, for example.

In yet another embodiment, the received reality factor(s) may comprise information related to a salary cap for a real league (e.g., providing that real teams within the real league may not exceed a salary of a specified amount), and at 206 the salary cap information may be applied to create a fantasy rule for the fantasy league. For example, the fantasy rule may inhibit an acquisition of players based on minimum contract value (e.g., a fantasy team may merely acquire fantasy players if a fantasy payroll of the fantasy team covers a maximum contract value for a potential player), for example. Therefore, if a fantasy team owner has twenty million in remaining fantasy payroll, the fantasy rule may be configured to inhibit a fantasy team from acquiring a fantasy player with a fifteen million dollar salary and six million dollars in potential incentives.

In one embodiment, the received reality factor(s) may comprise a salary cap, luxury payroll tax, and/or a revenue sharing plan from the real league, where the real league taxes teams based on a percentage of an amount the salary cap is exceeded by. For example, if a real team exceeds the salary cap by $X, the real team may owe the real league Y % of the $X. Further, in one embodiment, the luxury tax may be distributed to other teams within the real league to aid smaller market teams based on the revenue sharing plan. If the luxury payroll reality factor is applied to a fantasy league, a fantasy rule may be created at 206 comprising a fantasy salary cap, a fantasy luxury payroll tax (e.g., a percentage to be paid by a fantasy team upon exceeding the fantasy salary cap), and/or a fantasy revenue sharing plan, for example. It will be appreciated that the fantasy salary cap, fantasy luxury payroll tax, and/or distribution plan may be scaled to facilitate implementation within the fantasy league. Therefore, if the real league has a salary cap of two hundred million and a tax of ten percent, the fantasy league may tailor the fantasy rule to implement scaled variations of the salary cap, luxury tax, and/or revenue sharing plan (e.g., a fantasy salary cap of one hundred million with a fantasy luxury tax rate of five percent), rather than matching numbers provided by the corresponding reality factor, for example. Further, the fantasy league may distribute the collected luxury tax to other fantasy teams to promote an aim of the salary cap, luxury payroll tax, and/or the revenue sharing plan, for example.

Another example of a reality factor that may be received at 204 may relate to a no-trade clause for a real player. The reality factor may reflect a clause stating that the real player may not be traded to another real team unless the real player provides consent for the trade. However, since aspects related to trade consent may not come into play in a fantasy environment, a fantasy rule may be created which inhibits trade of a corresponding fantasy player between fantasy teams (e.g., regardless of consent), for example.

In yet another example, a received reality factor may relate to a guaranteed money clause for a real player which provides that the real player may receive a salary from a real team in the event of an injury and/or release from the real team. To this end, a fantasy rule may be created that provides that a fantasy player on a fantasy team may be paid from a fantasy payroll of the fantasy team to which the fantasy player is associated unless the fantasy player is acquired by another team regardless of whether the fantasy player plays (e.g., if a first fantasy team acquires a fantasy player corresponding to a real player with a guaranteed money clause and the first fantasy team drops the fantasy player from a first fantasy team roster, the first fantasy team may be responsible for at least a portion of a salary for the dropped fantasy player until the fantasy player is acquired by a second fantasy team). On the other hand, a fantasy rule may be created that excuses a fantasy team owner from further obligations to a fantasy player corresponding to a real player upon release of the fantasy player from the fantasy team if a received reality factor indicates that a contract for the real player does not comprise a guaranteed money clause.

As another example, the received reality factor may relate to disciplinary action (e.g., fines received by the real player for committed transgressions), and a fantasy rule may be created which tracks a number of times a player receives discipline throughout a season and penalizes a fantasy team owner for corresponding behavior. For example, if a real player receives a fine (e.g., ten thousand dollars for unsportsmanlike conduct), the fantasy rule may carry the fine over from the real league to the fantasy league and deduct the ten thousand dollar fine from a payroll of a fantasy team comprising a fantasy player corresponding to the real player who received the fine. As another example, a fantasy rule may be created to inhibit a fantasy team owner from 'starting' a fantasy player upon a corresponding real player receiving disciplinary action.

Another reality factor may pertain to a signing bonus of a real player. Typically, a real player may be paid a signing bonus at a beginning of a contract term. Thus, a fantasy rule may be created which provides that respective fantasy teams may be charged with the signing bonus upon acquisition of a corresponding fantasy player. For example, if a first fantasy team acquires a fantasy player (corresponding to real player with a five million dollar signing bonus), the first fantasy team may be required to pay the fantasy a bonus using their fantasy payroll.

Yet another reality factor may relate to a performance bonus clause from a contract for a real player. Typically, a performance bonus provides a real player with a sum of money for achieving a pre-determined performance. For example, the performance bonus clause may award a baseball player a sum of money for winning a batting title. To this end, a fantasy rule may be created that is provides for the deduction of a performance bonus from a fantasy payroll of a fantasy team to which the corresponding fantasy player belongs, upon the real player achieving the pre-determined performance. That is, for example, if a real player has a performance bonus clause of ten million dollars for hitting fifty home runs, a performance bonus (e.g., which may be equal to the sum of the real performance bonus or may be different) may be deducted from a fantasy payroll of a fantasy team which owns a corresponding fantasy player.

As another example a reality factor may relate to an impact a real player has on other real players, a real franchise, a real team, and/or a real league, for example. A real player may impact a real team by demonstrating leadership, frame, creating locker room drama, media distractions, drawing fans based on a popularity of the real player, and/or creating opportunities for a real team to win games, etc. Based upon this reality factor, a fantasy rule may be created to determine an impact number indicative of an overall impact a real player has on a real franchise, a real team, and/or a real league, for example. In one embodiment, a positive impact number may be indicative of a positive impact of a real player while a negative impact number may represent a negative impact for the real player. Accordingly, if a real player adversely affects locker room chemistry and often receives boos from fans, a corresponding fantasy player may be assigned a negative impact number (e.g., and may cause a deduction in a payroll of a fantasy team to which the fantasy player is associated).

On the other hand, a real player who performs poorly on the field, but is otherwise generally popular, coveted by fans, and/or teammates may be assigned a higher impact number to be associated with a corresponding fantasy player (e.g., and may cause an increase in a payroll of a fantasy team to which the fantasy player is associated). To this end, impact numbers for fantasy players of a fantasy team roster may be summed, averaged, and/or compared with corresponding impact numbers from a second fantasy team for head to head scoring, for example. The example method 200 ends at 208.

Figure 3:
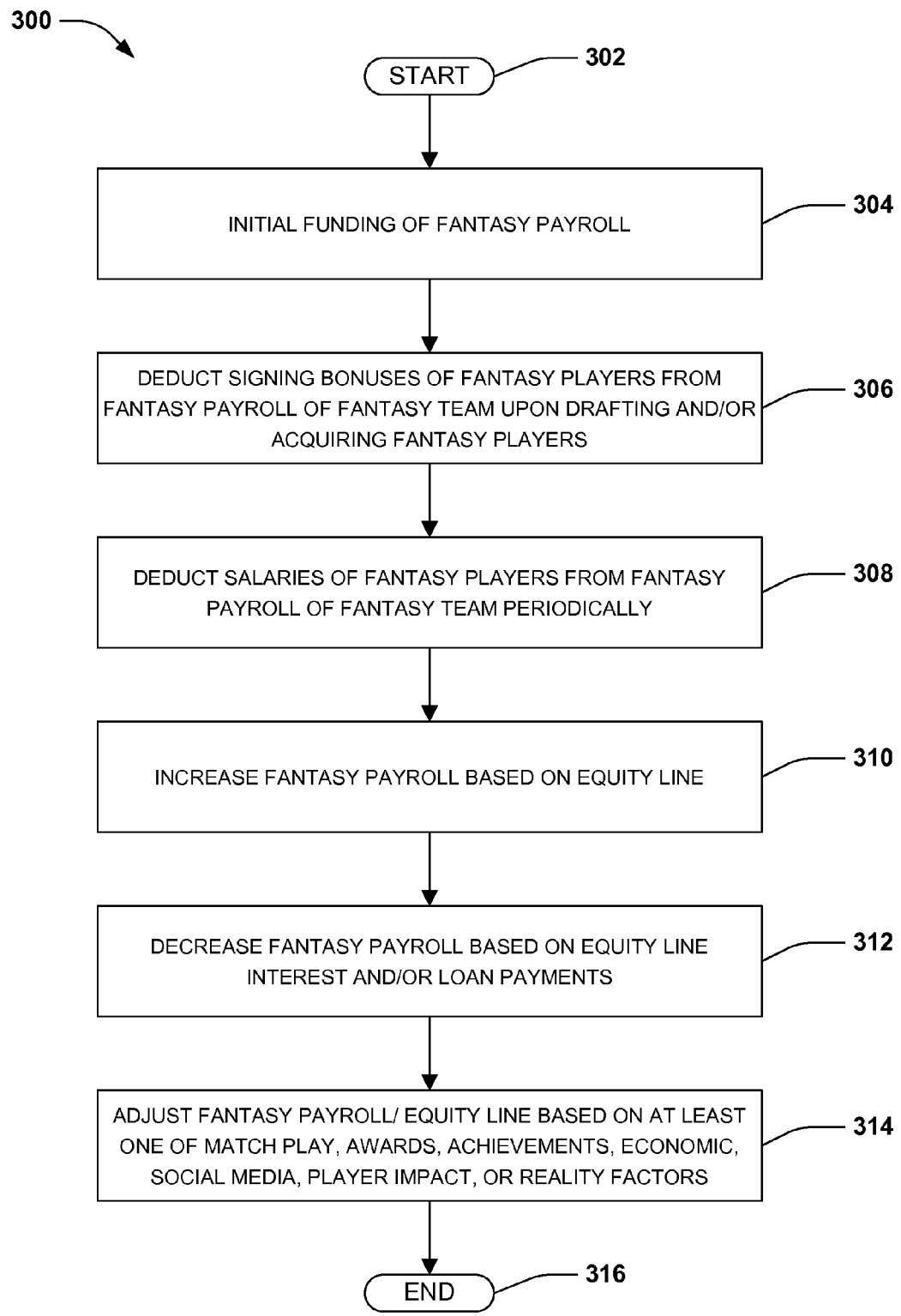
FIG. 3 is a flow diagram illustrating an example method where one or more techniques described herein may be implemented.

FIG. 3 is a flow diagram illustrating an example method 300 for applying the fantasy rule(s) created in the example method 200 of FIG. 2. The method 300 begins at 302 and continues at 304, where a fantasy payroll may be initially funded. For example, one or more fantasy team owners may pay real money to join a fantasy league. Further, a portion of the funding may be retained as prize money for winners (e.g., determined at an end of the season, mid-season, and/or upon the completion of respective head-to-head match-ups). Funding the fantasy payrolls may comprise funding a fantasy payroll for merely a single team, multiple fantasy payrolls for multiple fantasy teams, and/or funding for a whole fantasy league. An initial size of a fantasy payroll may be based on numerous factors, such as a size of the fantasy league, administrator input, and/or an amount of money paid to the league, etc. For example, a fantasy team owner may be able to adjust a fantasy payroll for the fantasy team by submitting an additional payment to the fantasy league. That is, for example, the fantasy league may begin respective fantasy team owners with a one hundred million (e.g., basic) fantasy payroll, increasable to two hundred million (e.g., a premium fantasy payroll) with a ten dollar league fee (e.g., a premium fee paid with real money).

In one embodiment of the example method 300, after a draft is held (e.g., as described in the example method 100 of FIG. 1), signing bonuses (e.g., for respective fantasy players corresponding to real players who have signing bonuses) may be deducted from respective fantasy payrolls of respective teams at 306. For example, if a fantasy team drafts a fantasy player corresponding to a real player who has a five million dollar signing bonus in his/her contract, the five million dollar signing bonus (e.g., or a signing bonus of a different sum) may be deducted from a fantasy payroll for the fantasy team. According to one aspect, a signing bonus for a fantasy player may be deducted from a fantasy payroll upon a fantasy team acquiring the fantasy player, regardless of whether the signing bonus has already been paid by another fantasy team. According to another aspect, signing bonuses may be deducted merely during a fantasy draft, enabling fantasy teams to acquire fantasy players (e.g., by trade, free agency, and/or waivers) during a fantasy season without paying the signing bonus.

At 308 in the example method, salaries of fantasy players may be deducted from a fantasy payroll of a fantasy team periodically throughout the season. In one embodiment, player salaries may be deducted on a weekly basis (e.g., but other deduction timetables are contemplated herein and may depend, for example, upon how a real league manages payroll deductions). For example, if a fantasy player has a sixteen million dollar salary (e.g., based upon a salary of a real player to which the fantasy player corresponds) and a season is sixteen weeks long, one million may be deducted from the fantasy payroll for that fantasy player weekly.

It will be appreciated that in another embodiment, fantasy player salaries and signing bonuses may be summed and deducted over a course of a season (e.g., such that the acts describes at 306 and 308 are merely a single act spread out over the season). For example, if a player has a one hundred million dollar salary and a sixty million dollar signing bonus, sixteen million may be deducted on a weekly basis over the course of a ten game season. In one embodiment, if a fantasy team acquires a fantasy player partway through the season, the fantasy team may be responsible for merely a portion of the fantasy player's salary that is due payable after the fantasy team has acquired the fantasy player.

At 310 in the example method, a payroll of a fantasy team may be increased based upon an equity line. For example, a fantasy team owner (e.g., participant) that desires to raise a fantasy payroll (e.g., obtain more imaginary money) for the fantasy team may request an equity line (e.g., by contributing a specified sum of real money), and an equity line may be extended (e.g., by the fantasy league) to increase the payroll of a fantasy team owned by the fantasy team owner. Various scenarios may arise which may justify use of the fantasy equity line. For example, if a fantasy team comprises injured fantasy players (e.g., fantasy players corresponding to real players who are injured), a fantasy team owner may wish to take out a loan through the fantasy equity line to obtain replacement fantasy players. As another example, if a fantasy team owner depletes a fantasy payroll of the fantasy team during an initial draft, performance bonuses may charge the fantasy team owner with additional (e.g., unexpected) fantasy payroll deductions. Accordingly, in this example, the fantasy team owner could request a loan using a fantasy equity line for an amount of the performance bonus.

At 312 in the example method 300, the payroll of a fantasy team may be decreased based upon equity line interest and/or loan repayment. For example, if a fantasy team owner receives a loan (e.g., equity line) at 310 to increase payroll, the fantasy team may be required to repay the loan, plus interest according to a loan repayment schedule (e.g., which may require that the loan by paid back by the end of a season and/or which may allow the loan to be repaid over the course of a plurality of seasons).

At 314 in the example method 300, fantasy payroll for a fantasy team may be adjusted to reflect management skills of a fantasy team owner for the fantasy team. According to one aspect, the fantasy payroll may be increased for winning and/or losing fantasy matches against other fantasy teams (e.g., providing a winner's revenue and a loser's revenue). These revenues may simulate income and/or cash flow a real franchise and/or a real team may earn from winning and/or losing games. Moreover, fantasy payroll may be based on reality factors, such as fan attendance (e.g., player impact). For example, respective fantasy players on a fantasy roster may be associated with fan attendance and/or player popularity. To this end, a cumulative effect on fan attendance may be determined from reality factors associated with respective fantasy players for respective fantasy teams. Accordingly, this impact on fan attendance may be used to determine adjustments to a fantasy payroll for a fantasy team. For example, a reality factor associated with high fan attendance may increase winning and/or losing revenue by a multiplication factor (e.g., multiplying the fantasy revenue by a multiplication factor greater than one). A low attendance reality factor may decrease fantasy revenue (e.g., by multiplying the fantasy revenue by a multiplication factor less than one). In one embodiment, awards and/or achievements may comprise an increase to the fantasy payroll and/or fantasy equity line. Further, adjustments may be made to interest rates of the fantasy equity line to reward and/or punish fantasy team owners. For example, if a fantasy team defaults on a fantasy loan payment, an increase may be made to the interest rate for the fantasy loan.

The fantasy payrolls and/or equity lines (e.g., interest rates on loans) may also be adjusted based upon a number of followers a fantasy team has. In one embodiment, webpages (e.g., including social media websites, blogs, microblogs, etc.) may be monitored for posts indicative of a fantasy team and a fantasy team may be rewarded (e.g., by an increased payroll and/or lower interest rates) for identify posts indicative of the fantasy team. For example, respective fantasy teams may create a webpage on a popular social networking webpage and based upon the number of followers of the webpage (e.g., the number of people liking the webpage, the number of people linking the webpage to a microblog, etc.), payroll (e.g., revenue) and/or an equity line may be adjusted. Moreover, it will be appreciated that while reference is made herein to adjusting the payroll and/or equity line to reward of a fantasy team, the payroll and/or equity line of a team may be negatively impacted if the fantasy team has few followers (e.g., just as the revenue of a real team with a smaller fan base may receive less revenue than another real team that has a much larger fan base). The example method 300 ends at 316.

Figure 4:
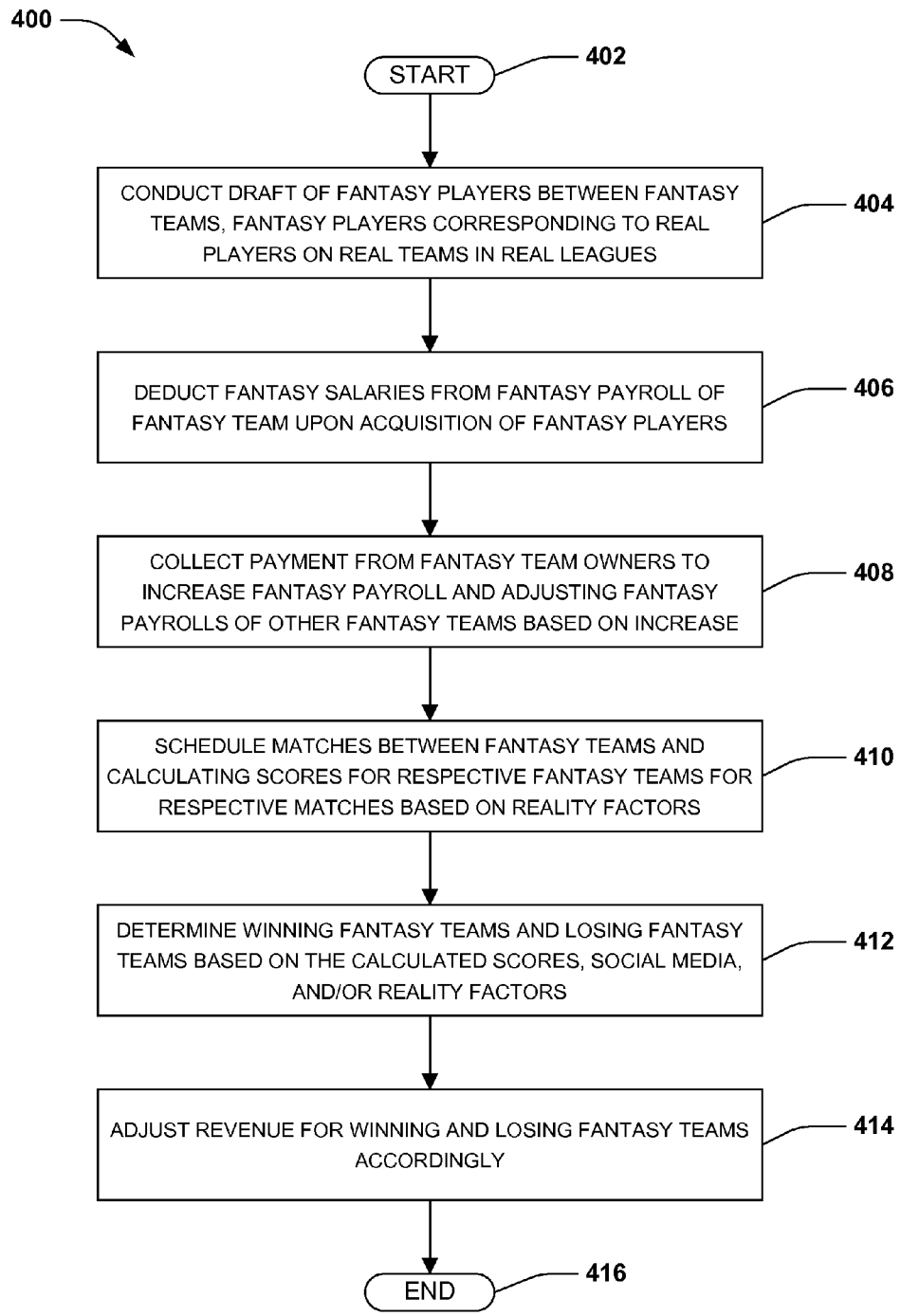
FIG. 4 is a flow diagram illustrating an example method where one or more techniques described herein may be implemented.

FIG. 4 is a flow diagram of an example method 400 for league play. The exemplary method 400 begins at 402 and continues at 404 where a draft of fantasy players may be conducted to distribute fantasy players (e.g., corresponding to real players) between fantasy teams as described above. At 406, salaries and/or signing bonuses of fantasy players may be deducted from a fantasy payroll for a fantasy team upon acquisition by the fantasy team as described above.

At 408 in the example method 400, fantasy payrolls may be increased for respective fantasy teams upon collection of one or more payments from respective fantasy team owners. For example, a payment (e.g., of real money) from one of the fantasy team owners may increase a fantasy payroll for a fantasy team from one hundred million to two hundred million. In one embodiment, however, an increase to a fantasy payroll of one team may trigger adjustments (e.g., luxury tax revenue sharing) to fantasy payrolls of other teams, the adjustments based on the increase to the fantasy payroll. For example, if one fantasy team increases their fantasy payroll (e.g., by submitting an additional league fee), remaining fantasy teams may receive a smaller increase (e.g., at no additional fee or for a smaller fee) in fantasy payroll. It will be appreciated that increasing the fantasy payrolls of remaining teams may be optional, as a fantasy league may implement an increase in fantasy payroll for one team without making adjustments to fantasy payrolls for other teams.

At 410 in the example method 400, matches may be scheduled, held, and/or conducted between fantasy teams and scores may be calculated for respective fantasy teams and/or fantasy matches based on fantasy players on respective fantasy teams, reality factors associated with respective fantasy players, and/or statistics associated with fantasy players on respective fantasy teams. For example, scores may be calculated by summing and/or averaging statistics for respective scoring categories. That is, for example, in a fantasy football league, a total number of touchdowns may be tallied for respective fantasy teams, and a point may be awarded to a team with a higher number of touchdowns. Some categories may award points for smaller numbers rather than larger ones and/or some categories may be scored different than other categories (e.g., a team with the most touchdowns may be awarded two points and a team with the most field goals may be awarded merely one point). For example, with regard to a number of fumbles a fantasy team collectively commits, a fantasy team with a lower number of fumbles generally receives one or more points for the fumble scoring category. In another example, scores may comprise player popularity (e.g., a team with a higher average popularity for respective fantasy players may be awarded with one or more points). Further, a score may comprise tallies of social media interaction (e.g., a post, tag, like, microblog, text, etc.) related to the fantasy team. For example, a scoring category may comprise a social media competition to determine a team which generates more social media attention (e.g., during the period in which two or more teams are matched up). To this end, the scoring competition may track a number of positive and/or negative social media actions related to respective fantasy teams (e.g., over the course of the matchup). In one embodiment, the fantasy team drawing more positive social media action may be awarded with a point. In another embodiment, the number of negative social media actions may be subtracted from the number of positive social media actions to determine a number for the social media competition for respective teams.

At 412 in the example method 400, a winning fantasy team and a losing fantasy team may be determined based on calculated scores (e.g., the winning fantasy team winning more scoring categories and/or more total points).

At 414 in the example method 400, winning and losing teams may be awarded winning and losing revenues (e.g., or losses) to respective fantasy payrolls. The example method 400 ends at 416.

Figure 5:
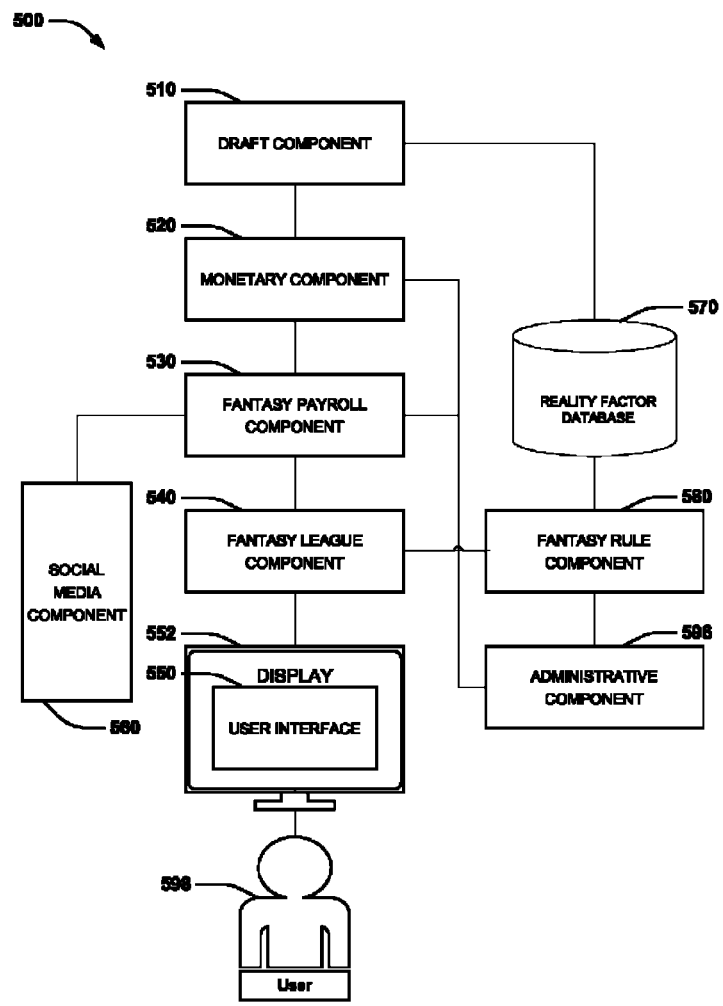
FIG. 5 is a component diagram of an exemplary system for managing a fantasy league.

FIG. 5 is a component diagram of an exemplary system 500 for fantasy league management. A draft component 510 may be configured to administer a draft of fantasy players between one or more (e.g., but preferably two or more) fantasy teams of a fantasy league. In one embodiment, the draft component 510 may be configured to present fantasy team owners with a pre-sorted set of fantasy players available for draft. According to one aspect, the draft component 510 may be configured to enable fantasy team owners to customize the pre-sorted set to reflect a desired draft order for the fantasy team owner. Further, in one example, the draft component 510 may be configured to alert fantasy team owners of potential deficiencies of a fantasy team roster. In one embodiment, the draft component 510 may be configured to enable fantasy team owners to arrange trades for at least one of a fantasy player, a fantasy team, fantasy payroll, and/or a fantasy draft pick. It will be appreciated that the draft component 510 may be configured to enable trades before, during, and/or after a fantasy draft. Fantasy players may also be acquired during a fantasy season using the draft component 510 to pick up dropped players through waivers and/or undrafted free agents.

A monetary component 520 may be configured to accept payments from fantasy team owners to fund the fantasy league. For example, the monetary component 520 may be configured to accept a base payment to fund a fantasy team with a basic fantasy payroll. Further, the monetary component 520 may be configured to accept additional payments to increase the fantasy payroll or invoke a fantasy equity line (e.g., as described above). To this end, an invoked fantasy equity line may charge a fantasy team with loan repayments and interest. In one embodiment, monetary component 520 may be configured to collect a payment from one or more fantasy team owners for trading a fantasy player. The monetary component 520 may be also configured to award prizes (e.g., for winning, achievements, etc.) to fantasy team owners at an end of a fantasy season. For example, awards may comprise additional fantasy payroll, a reduction in fantasy equity line interest rate, additional roster spots, etc. Further, achievements may comprise going on a fantasy win streak, breaking a fantasy win streak of another fantasy team owner, having a highest win to fantasy payroll ratio in the fantasy league, having a best record in the fantasy league, acquiring a fantasy player with a best performance to fantasy payroll ratio, etc.

According to one aspect, the monetary component 520 may be configured to adjust a value (e.g., stock value) for a fantasy team based on fantasy players on the fantasy team (e.g., changes to the fantasy team and/or a starting lineup for the fantasy team), management of the fantasy team (e.g., a win-loss record for the fantasy team), or an outlook for the fantasy team (e.g., owning future draft picks, a prediction related to performance of the fantasy team). Further, the value may fluctuate similar to stock values within a stock market. In one embodiment, fantasy team owners may conduct transactions based on the adjusted value. That is, for example, a fantasy team owner could sell a fantasy team to another person based on the adjusted value for the fantasy team. It will be appreciated that monetary component 520 may be configured to adjust the value for respective fantasy teams in real-time. For example, if a news flash announces that a star player is injured in real life, the monetary component 520 may adjust the value for the fantasy team owning the corresponding fantasy player in a corresponding fashion. In one embodiment, the monetary component 520 may be configured to collect a payment (e.g., of real money) from one or more fantasy teams involved in a trade of a fantasy player and/or a fantasy pick. For example, a fee associated with a trade may be based on a monetary value (e.g., a higher ranked fantasy player may have a higher monetary value than a lower ranked fantasy player) of a particular draft pick. To this end, if a real player is injured, a monetary value for a corresponding fantasy player may be adjusted. In one embodiment, monetary component 520 may manage an escalating revenue-sharing system. For example, income and/or revenue of a league may be tracked, and users may be awarded a percentage against a league fee. The award percentage may increase and/or decrease over time based on factors disclosed herein (e.g., fantasy stock value, reality factors, win-loss records, efficiency, profitability, etc.).

A fantasy payroll component 530 may be configured to manage fantasy payrolls (e.g., play money) for respective fantasy teams and provide at least one of an available fantasy payroll and/or a spent fantasy payroll for respective fantasy teams. In one embodiment, the fantasy payroll component 530 may be configured to add and/or subtract revenue (e.g., for participating in fantasy matchups) to a fantasy payroll and subtract expenses (e.g., player salaries, bonuses, etc.) from the fantasy payroll on a periodic basis. In one embodiment, the fantasy payroll component 530 may be configured to deduct one or more fees from fantasy payrolls of one or more fantasy teams involved in a trade of a fantasy player and/or a fantasy pick. The fantasy payroll component 530 may be configured to manage salary caps for a fantasy league, luxury taxes, and/or distribution of the luxury taxes, for example. In one embodiment, fantasy payroll component 530 and/or monetary component 520 may penalize (e.g., charge fantasy money and/or real money) and/or require a fantasy team owner to spend above a minimum fantasy payroll amount (e.g., a fantasy salary floor). The fantasy payroll component 530 may further be configured to provide a fantasy equity line (e.g., fantasy loans) to fantasy team owners in exchange for repayment and interest.

A fantasy league component 540 may be configured to schedule league play (e.g., head to head matchups and/or matches between fantasy teams) and enable interaction between fantasy teams, fantasy players, and/or the fantasy league. In one embodiment, the fantasy league component 540 may be coupled with a processing unit (not shown).

Further, the fantasy league component 540 may be configured to calculate scores for scheduled matches. According to one aspect, the fantasy league component 540 may be configured to calculate the scores based on statistics of fantasy players on respective fantasy teams. For example, if a fantasy player is on a fantasy team, and a real player corresponding to the fantasy player scores two touchdowns, fantasy league component may be configured to award two corresponding touchdowns to the fantasy team. The fantasy league component 540 may also be configured to determine a winning fantasy team and/or a losing fantasy team based on the calculated scores.

A display 552 may allow a user 598 to interact with a user interface 550 to manage a fantasy team. The user interface 550 may be configured to allow the user 598 to setup a lineup for a fantasy team, for example. In one embodiment, the user interface 550 may be configured to enable the user 598 to start, bench, add, and/or drop fantasy players on a fantasy team. The user interface 550 will be described in further detail at least with regard to FIG. 6-FIG. 8.

Social media component 560 may be configured to facilitate social media interaction between at least one of the fantasy league, fantasy team owner, and fantasy team and various social media. Social media component 560 may be configured to track social media actions (e.g., likes, posts, microblogs, texts, messages, emails, etc.) related to fantasy teams within a fantasy league, and further identify a social media action as at least one of positive, neutral, and/or negative, for example. In one embodiment, social media component 560 may be configured to compare a volume of social media activity for one fantasy team with the volume of social media activity for another fantasy team and determine a winner for a social media scoring category in connection with the fantasy league component 540. In one embodiment, social media component 560 may generate revenue for a fantasy team owner based on the tracked social media action related to a fantasy team.

A reality factor database 570 may be configured to access reality factor data related to a real player, real team, and/or real league. The reality factor database will be described in further detail at lease with regard to FIG. 9.

A fantasy rule component 580 of the example system 500 may be configured to generate and/or create fantasy rules based on application of reality factors from the reality factor database 570. It will be appreciated that the fantasy rule component 580 may be configured to create fantasy rules by scaling reality factors to facilitate implementation in a fantasy league. Accordingly, fantasy rules may not have a 1:1 correspondence with reality factors from which the fantasy rules are derived (e.g., but may be configured to mimic a real league when possible).

An administrative component 596 may be configured to enable an administrator to modify aspects related to a fantasy player, fantasy team, and/or a fantasy league. For example, the administrative component 596 may be configured to enable an administrator to expand a roster size for the fantasy league from ten to twelve slots. In one embodiment, the administrative component 596 may be configured to allow the administrator to modify aspects related to fantasy matchups, by changing scoring systems (e.g., between category scoring and point total scoring). Further the administrative component 596, may be operatively coupled to and have control over fantasy rule component 580, fantasy payroll component 530, and/or monetary component 520, for example. Therefore, the administrative component 596 may be configured to alter fantasy payrolls for fantasy teams, create fantasy rules, waive league fees, etc. In one embodiment, the administrative component 596 may be configured to enable league approval of trades between fantasy teams (e.g., by vote of fantasy teams not participating in the trades).

Figure 6:
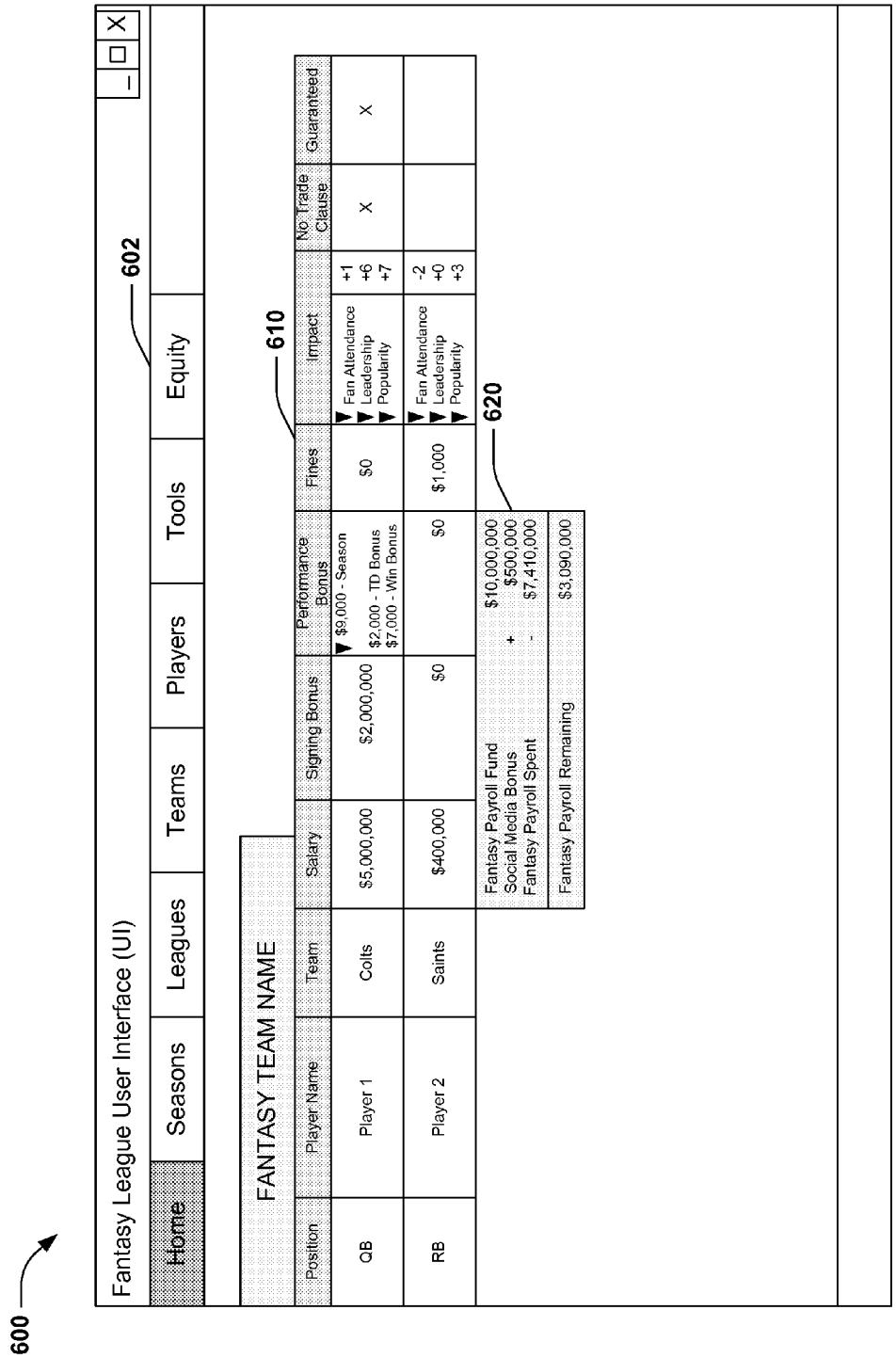
FIG. 6 is an illustration an example embodiment of a user interface for fantasy league management.
Figure 7:
FIG. 7 is an illustration an example embodiment of a user interface for fantasy league management.
Figure 8:
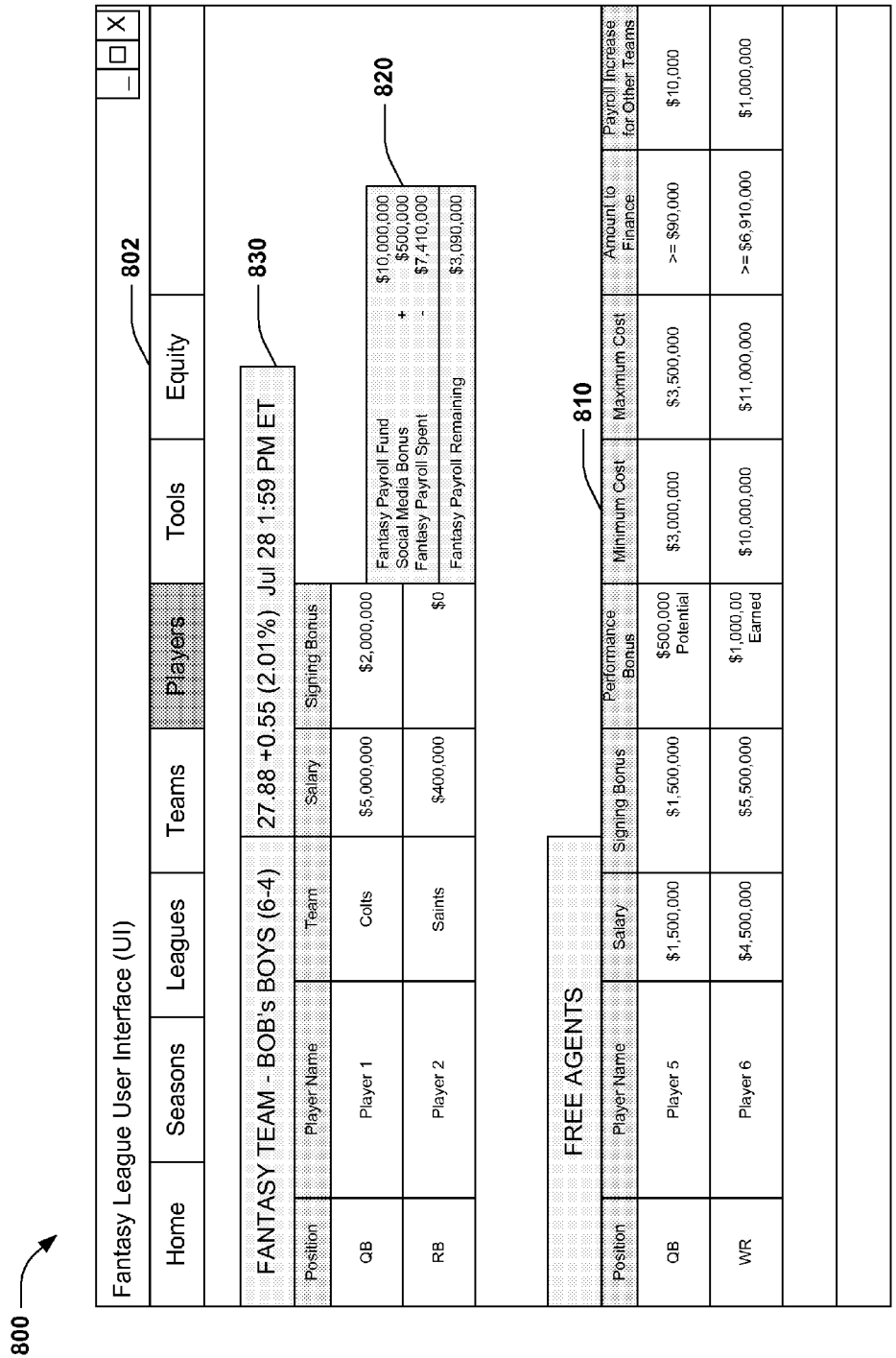
FIG. 8 is an illustration an example embodiment of a user interface for fantasy league management.

FIGS. 6-8 are illustrations of example embodiments of a user interface for fantasy league management (e.g., which may be displayed on a display such as the display 552 of the example system 500 illustrated in FIG. 5). FIG. 6 illustrates the user interface presenting a fantasy team roster and information related to fantasy players on the roster. In one embodiment, equity button 602 may enable a user and/or a fantasy team owner to initiate a loan through an equity line. Field bar 610 may be configured to provide and/or sort data pertaining to the roster of fantasy players for the fantasy team. Fantasy payroll summary box 620 may be configured to present an amount of a fantasy payroll available and/or a fantasy payroll spent. FIG. 7 illustrates a head-to-head matchup between two fantasy teams, and a fantasy team value (e.g., a stock value) 730. Field bar 710 may provide additional and/or different information based on a setup of a fantasy league, for example. In one embodiment, winning revenue and losing revenue 750 may be provided for respective fantasy teams based on totals 748 for scoring categories within field bar 710. FIG. 8 illustrates a view of the user interface configured for free agent drafting. Equity line 802 enables a fantasy team (e.g., Bob's Boys) to borrow additional fantasy payroll if desired. For example, field bar 810 may present an amount to finance to a fantasy team owner, if the fantasy team owner desires to acquire a fantasy player. Stock value 830 may fluctuate based on changes to a fantasy roster of the fantasy team, player updates, league updates, and/or other reality factors, for example.

Figure 9:
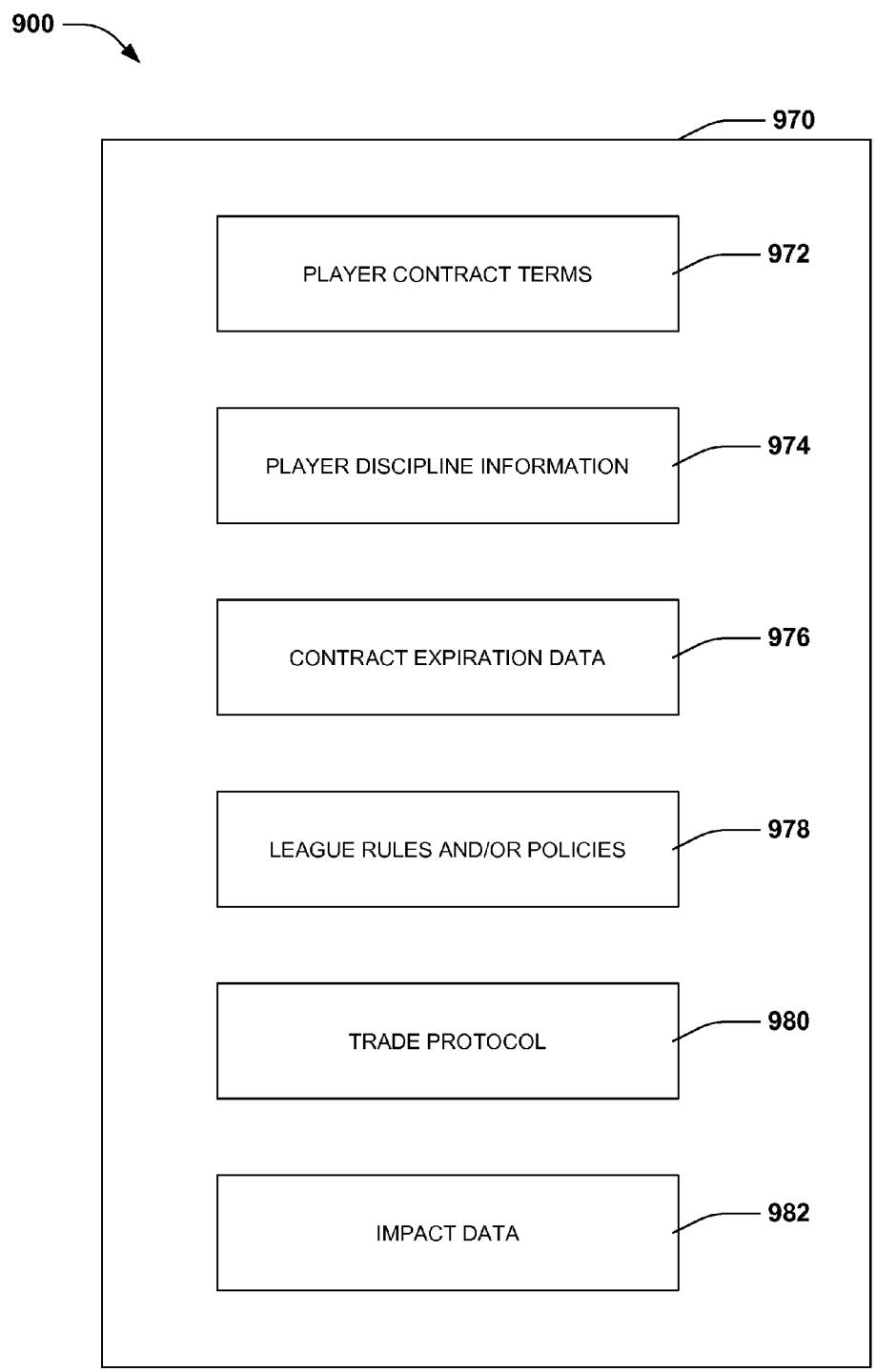
FIG. 9 is a component diagram of an exemplary system for managing a fantasy league.

FIG. 9 is a component diagram 900 of an exemplary reality factor database 970 comprising one or more reality factors that may be used to generate fantasy rules, for example. Player contract terms 972 may be configured to comprise data related to contracts of real players. For example, contract terms 972 may comprise data pertaining to a player salary, signing bonus, performance bonus, no trade clauses, guaranteed money clauses, contract length, contract value of real players, etc. Contract expiration data 976 may comprise data relating to expiration dates of contracts for the real players, to determine fantasy rules for releasing fantasy player, for example. Player discipline information 974 may comprise disciplinary actions related to a real player. For example, if a real player is fined (e.g., by a real team, a real league, and/or a court), charged with a crime in real life, sent to minor leagues (e.g., for punishment rather than rehabilitation), player discipline information 974 may reflect such disciplinary action. League rules and/or policies 978 may comprise collective bargaining agreements, salary caps, luxury taxes, and/or revenue sharing plans, etc. Further, league policies 978 may comprise data related to interest rates of real teams for real loans and/or cash flow information for real teams, for example. Trade protocol 980 may comprise data pertaining to a timing of permitted trades (e.g., before a trade deadline) or how trades may be conducted within a real league (e.g., future draft picks may or may not be considered bargaining chips for real players). Impact data 982 may comprise miscellaneous data related to an impact a real player may have on a real team. Impact data 982 may comprise popularity, fan and/or game attendance, media coverage, locker room chemistry, leadership, in-lineup and out of lineup win-loss ratios, etc.

Figure 10:
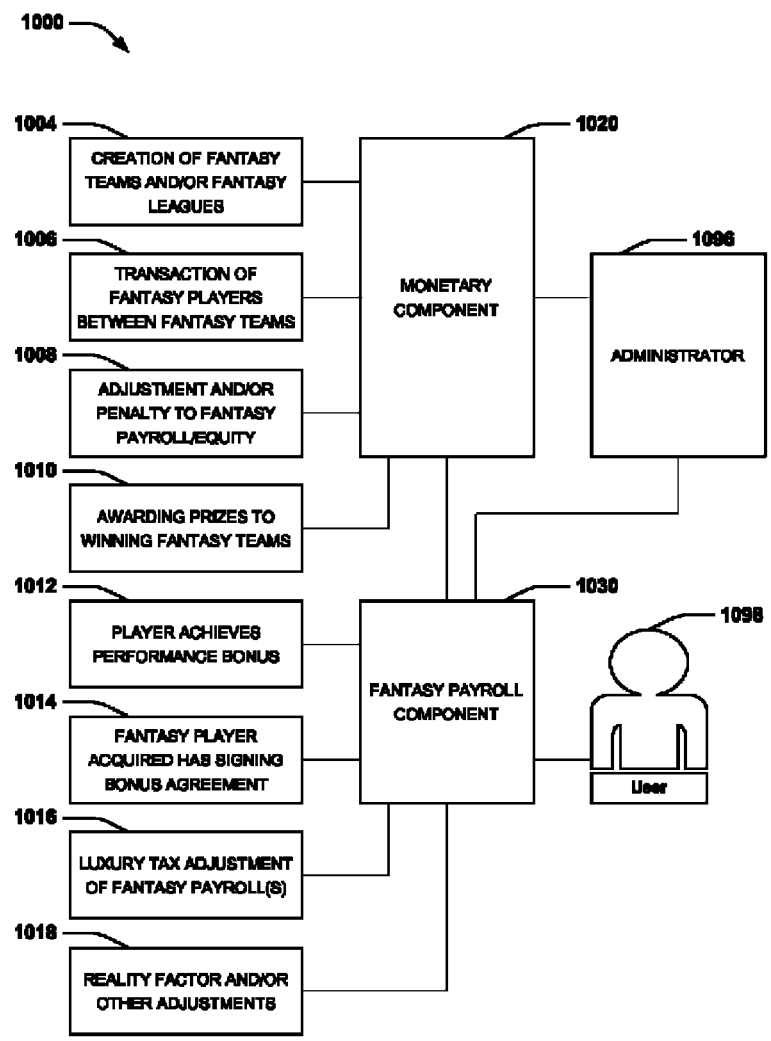
FIG. 10 is a component diagram of an exemplary system for managing a fantasy league.

FIG. 10 is a component diagram of an exemplary system for managing a fantasy league. Acts related to creating a fantasy league 1004, engaging in a transaction of fantasy players 1006, and/or adjusting fantasy payroll and/or a fantasy equity line 1008 may initiate action by a monetary component 1020 (e.g., 520 in FIG. 5). In one embodiment, the monetary component 1020 may be configured to collect a payment of real money upon at least one of the acts of 1004, 1006, and/or 1008. The monetary component 1020 may also be configured to award prizes (e.g., real money) to fantasy teams at 1010, for example. A fantasy payroll component 1030 (e.g., 530 in FIG. 5), on the other hand, may be configured to deal with fantasy currency, such as fantasy payroll, for example. The fantasy payroll component 1030 may also be configured to deduct money from a fantasy payroll of a fantasy team upon a corresponding real player achieving a performance threshold which triggers a performance bonus in real life 1012, upon the fantasy team acquiring a fantasy player with a corresponding real signing bonus 1014, etc. Further, the fantasy payroll component 1030 may be configured to increase a fantasy payroll for a fantasy team 1016, increase fantasy payrolls for other fantasy teams 1016 (e.g., as a result of a luxury tax distribution), and/or decrease the fantasy payroll for the fantasy team 1016, for example. Reality factors 1018 may activate the fantasy payroll component 1030 as well. Additionally, an administrator 1096 may access (e.g., through an administration component, not shown) the monetary component 1020 and/or the fantasy payroll component 1030 to facilitate administration of the fantasy league. User 1098 may be granted access to fantasy payroll component 1030 for acquisition of fantasy players, for example.

It will be appreciated that creating rules based upon reality factor(s) may provide at least a benefit of more closely emulating at least one of a real player, real team, real league, and/or relationships thereof upon application to a fantasy environment, for example. Conventionally, fantasy teams could hoard fantasy players without regard to reality factors, such as salaries of players, aspects of player contracts (e.g., guaranteed money, no trade clauses, etc.), league policies (e.g., trading deadlines, trade protocol, salary caps, and/or luxury taxes), and/or cash flow (e.g., equity lines and/or interest rates). To this end, aspects related to reality factors are believed to facilitate a closer simulation of reality (e.g., a real team may not afford a roster of top players, thus reflected by reality factors), thereby affording a fantasy team owner a more realistic management experience. Further, creating fantasy rules based upon reality factors provide a benefit of creating an unknown variable related to a fantasy player's cost (e.g., in terms of fantasy payroll), thereby rewarding fantasy team owners who select profitable draft picks. Accordingly, these unknowns may challenge fantasy team owners to not only select fantasy players based on production, but also to closely emulate good decision making (e.g., draft a player as a package, rather than solely on one aspect such as production) similar to that of a real general manager.

Figure 11:
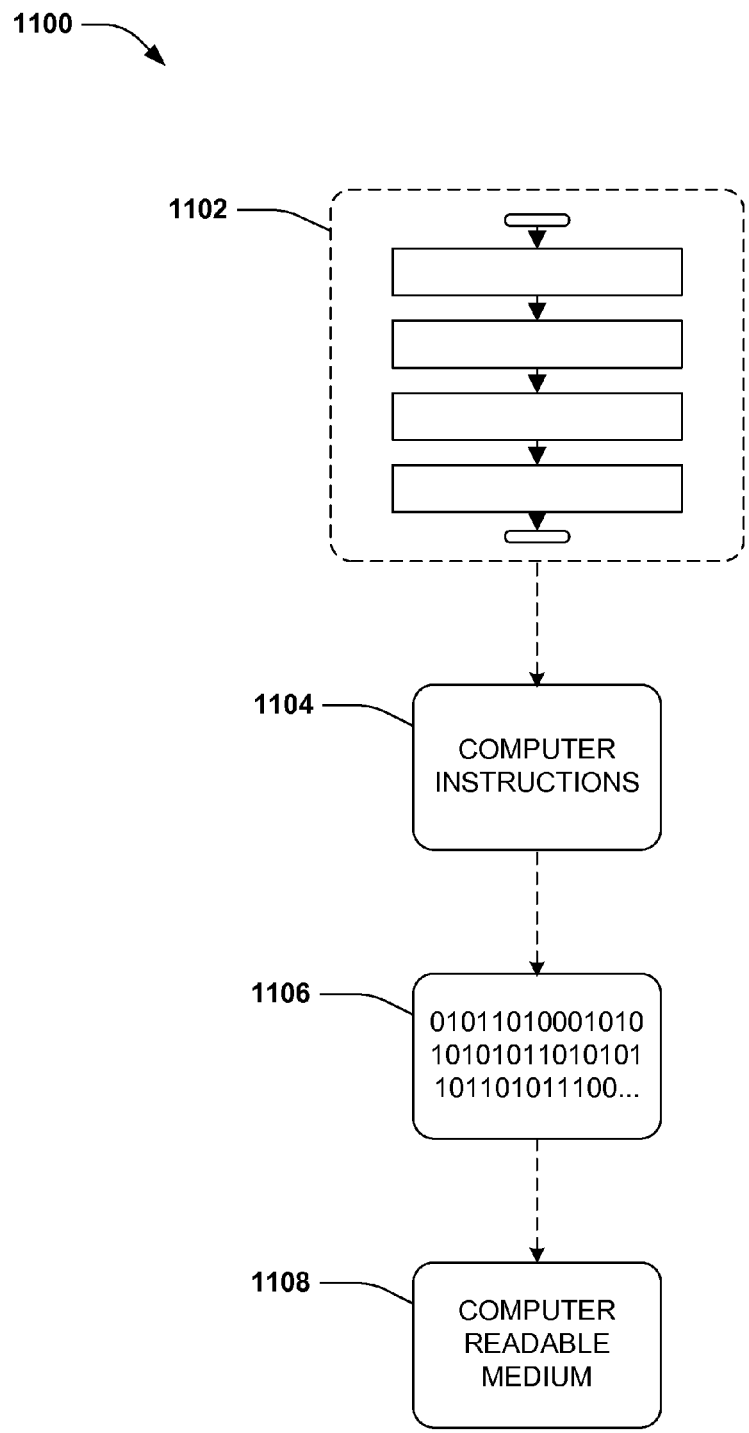
FIG. 11 illustrates an exemplary computing environment where one or more of the provisions set forth herein may be implemented.

Still another embodiment involves a computer-readable medium comprising processor-executable instructions configured to implement one or more of the techniques presented herein. An exemplary computer-readable medium that may be devised in these ways is illustrated in FIG. 11, wherein the implementation 1100 comprises a computer-readable medium 1108 (e.g., a CD-R, DVD-R, or a platter of a hard disk drive), on which is encoded computer-readable data 1106. This computer-readable data 1106 in turn comprises a set of computer instructions 1104 configured to operate according to one or more of the principles set forth herein. In one such embodiment 1102, the processor-executable instructions 1104 may be configured to perform a method, such as at least some of the exemplary method 100 of FIG. 1, for example. In another such embodiment, the processor-executable instructions 1104 may be configured to implement a system, such as at least some of the exemplary system 500 of FIG. 5, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processing unit, a processing unit, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 12:
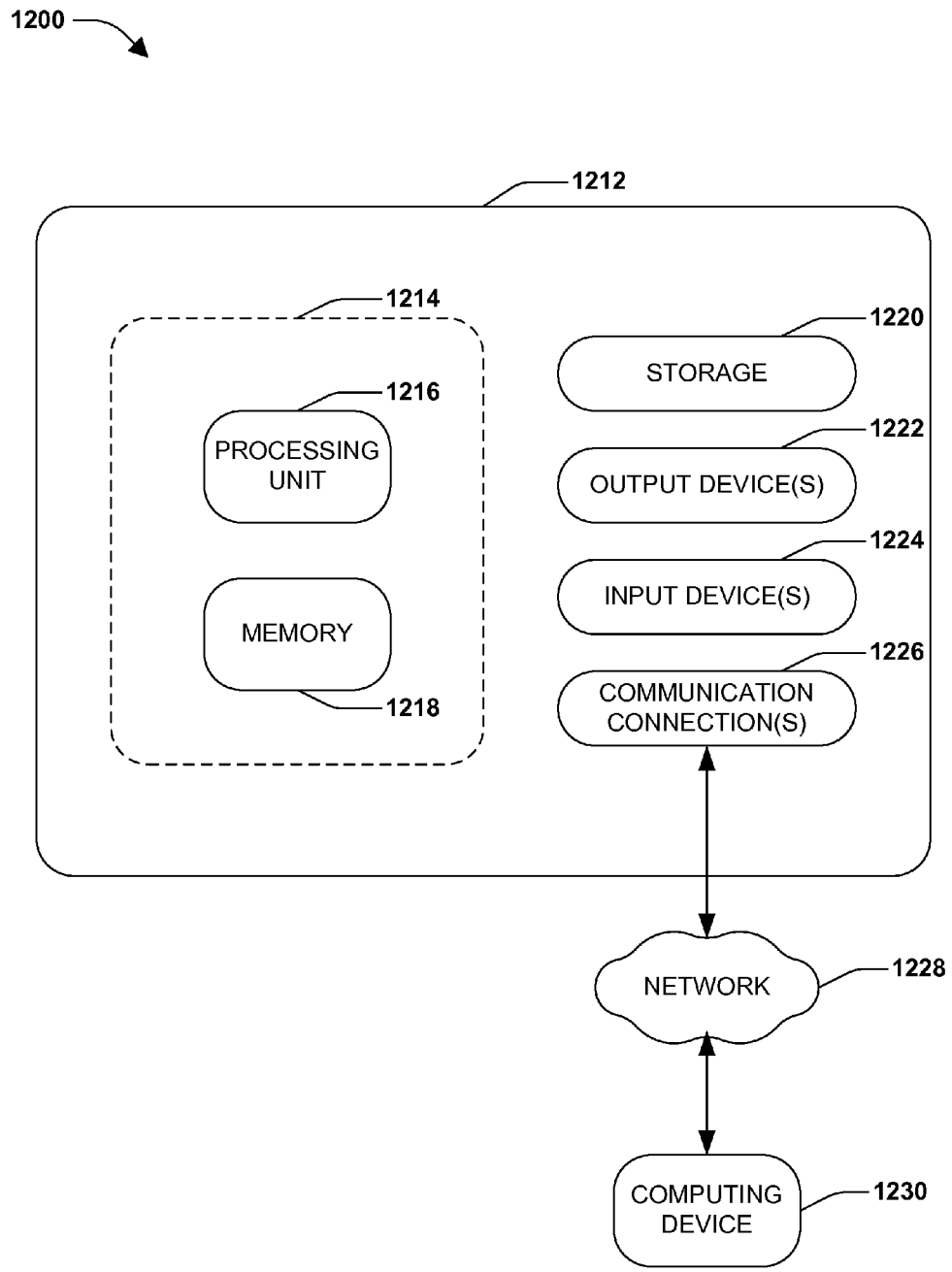
FIG. 12 is an illustration of an exemplary computer-readable medium comprising processor-executable instructions configured to embody one or more of the provisions set forth herein.

FIG. 12 and the following discussion provide a brief, general description of a suitable computing environment to implement embodiments of one or more of the provisions set forth herein. The operating environment of FIG. 12 is only one example of a suitable operating environment and is not intended to suggest any limitation as to the scope of use or functionality of the operating environment. Example computing devices include, but are not limited to, personal computers, server computers, hand-held and/or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 12 illustrates an example of a system 1210 comprising a computing device 1212 configured to implement one or more embodiments provided herein. In one configuration, computing device 1212 includes at least one processing unit 1216 and memory 1218. Depending on the exact configuration and type of computing device, memory 1218 may be volatile (such as RAM, for example), non-volatile (such as ROM, flash memory, etc., for example) or some combination of the two. This configuration is illustrated in FIG. 12 by dashed line 1214.

In other embodiments, device 1212 may include additional features and/or functionality. For example, device 1212 may also include additional storage (e.g., removable and/or non-removable) including, but not limited to, magnetic storage, optical storage, and the like. Such additional storage is illustrated in FIG. 12 by storage 1220. In one embodiment, computer readable instructions to implement one or more embodiments provided herein may be in storage 1220. Storage 1220 may also store other computer readable instructions to implement an operating system, an application program, and the like. Computer readable instructions may be loaded in memory 1218 for execution by processing unit 1216, for example.

The term "computer readable media" as used herein includes computer storage media. Computer storage media includes volatile and nonvolatile, removable and non-removable media implemented in any method or technology for storage of information such as computer readable instructions or other data. Memory 1218 and storage 1220 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1212. Any such computer storage media may be part of device 1212.

Device 1212 may also include communication connection(s) 1226 that allows device 1212 to communicate with other devices. Communication connection(s) 1226 may include, but is not limited to, a modem, a Network Interface Card (NIC), an integrated network interface, a radio frequency transmitter/receiver, an infrared port, a USB connection, or other interfaces for connecting computing device 1212 to other computing devices. Communication connection(s) 1226 may include a wired connection or a wireless connection. Communication connection(s) 1226 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1212 may include input device(s) 1224 such as keyboard, mouse, pen, voice input device, touch input device, infrared cameras, video input devices, and/or any other input device. Output device(s) 1222 such as one or more displays, speakers, printers, and/or any other output device may also be included in device 1212. Input device(s) 1224 and output device(s) 1222 may be connected to device 1212 via a wired connection, wireless connection, or any combination thereof. In one embodiment, an input device or an output device from another computing device may be used as input device(s) 1224 or output device(s) 1222 for computing device 1212.

Components of computing device 1212 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1212 may be interconnected by a network. For example, memory 1218 may be comprised of multiple physical memory units located in different physical locations interconnected by a network.

Those skilled in the art will realize that storage devices utilized to store computer readable instructions may be distributed across a network. For example, a computing device 1230 accessible via network 1228 may store computer readable instructions to implement one or more embodiments provided herein. Computing device 1212 may access computing device 1230 and download a part or all of the computer readable instructions for execution. Alternatively, computing device 1212 may download pieces of the computer readable instructions, as needed, or some instructions may be executed at computing device 1212 and some at computing device 1230.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in respective embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B or the like generally means A or B or both A and B.

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising".

What is claimed is:

1. A method for managing a fantasy league, comprising:
conducting a draft during which a fantasy player, representing a real player within the fantasy league, is drafted to a fantasy team of the fantasy league;
receiving a contract clause describing an aspect of a contract between the real player and a real team to which the real player is a member, wherein the contract clause comprises a bonus stipulation describing a bonus the real player is to receive when a goal is achieved; and
applying a fantasy bonus stipulation to the fantasy player in the fantasy league when the fantasy player achieves the goal, the fantasy bonus stipulation based upon the bonus stipulation, wherein at least one of the conducting, the receiving, or the applying is implemented at least in part via a processing unit.

2. The method of claim 1, wherein the contract clause comprises a salary clause and the method comprises:
determining a fantasy salary of the fantasy player based upon the salary clause.

3. The method of claim 2, comprising:
deducting the salary of the fantasy player from a payroll of the fantasy team.

4. The method of claim 1, wherein the contract clause comprises a salary clause describing how a salary of the real player is to be distributed over a term of the contract, and the method comprises:
distributing a fantasy salary of the fantasy played based upon the salary clause.

5. The method of claim 1, wherein the contract clause comprises a trade stipulation controlling how the real team trades the real player, and the applying comprises:
method a fantasy trade stipulation to the fantasy player, the fantasy trade stipulation based upon the trade stipulation and controlling how the fantasy team trades the fantasy player.

6. The method of claim 1, wherein the contract clause comprises an injury stipulation describing how the real player is to be compensated due to an injury, and the method comprises:
applying a fantasy injury stipulation to the fantasy player when the real player is injured, the fantasy injury stipulation based upon the injury stipulation and describing how the fantasy player is to be compensated when the injury occurs to the real player.

7. The method of claim 1, the fantasy league comprising a fantasy football league.

8. The method of claim 1, wherein the receiving comprises:
analyzing a news article; and
inferring the contract clause based upon the news article.

9. The method of claim 1, wherein the receiving comprises:
receiving a copy of the contract; and
analyzing the contract to identify the contract clause.

10. A system for managing a fantasy league, comprising:
a processing unit; and
memory for storing instructions which when executed by the processing unit perform a method, the method comprising:
conducting a draft during which a first fantasy player, representing a real player within the fantasy league, is drafted to a first fantasy team team of the fantasy league;
receiving a contract clause describing an aspect of a contract between the real player and a real team to which the real player is a member, wherein the contract clause comprises a bonus stipulation describing a bonus the real player is to receive when a goal is achieved; and
applying a fantasy bonus stipulation to the first fantasy player in the fantasy league when the first fantasy player achieves the goal, the fantasy bonus stipulation based upon the bonus stipulation.

11. The system of claim 10, the method comprising:
deducting a signing bonus from an account associated with the first fantasy team upon the first fantasy team drafting the first fantasy player, the signing bonus determined based upon a signing bonus stipulated in the contract.

12. The system of claim 10, the method comprising:
applying a credit to an account associated with the first fantasy team, a value of the credit determined based upon a number of entities associated with the first fantasy team on a social networking forum.

13. The system of claim 10, the method comprising:
deducting, from an account associated with the first fantasy team, a specified fine when a payroll of the first fantasy team exceeds a payroll cap.

14. A non-transitory computer readable medium comprising computer-executable instructions that when executed perform a method, the method comprising:
conducting a draft during which a fantasy player, representing a real player within the fantasy league, is drafted to a fantasy team of the fantasy league;
receiving a contract clause describing an aspect of a contract between the real player and a real team to which the real player is a member member, wherein the contract clause comprises a bonus stipulation describing a bonus the real player is to receive when a goal is achieved; and
applying a fantasy bonus stipulation to the fantasy player in the fantasy league, when the fantasy player achieves the goal, the fantasy bonus stipulation based upon the bonus stipulation.

15. The non-transitory computer readable medium of claim 14, wherein the contract clause comprises a salary clause and the method comprises:
determining a fantasy salary of the fantasy player based upon the salary clause.

16. The non-transitory computer readable medium of claim 15, comprising:
deducting the salary of the fantasy player from a payroll of the fantasy team.

17. The non-transitory computer readable medium of claim 14, wherein the contract clause comprises a salary clause describing how a salary of the real player is to be distributed over a term of the contract, and the method comprises:
distributing a fantasy salary of the fantasy played based upon the salary clause.

18. The non-transitory computer readable medium of claim 14, wherein the contract clause comprises a trade stipulation controlling how the real team trades the real player, and the method comprises:
applying a fantasy trade stipulation to the fantasy player, the fantasy trade stipulation based upon the trade stipulation and controlling how the fantasy team trades the fantasy player.

19. The non-transitory computer readable medium of claim 14, wherein the contract clause comprises an injury stipulation describing how the real player is to be compensated due to an injury, and the method comprises:
applying a fantasy injury stipulation to the fantasy player, the fantasy injury stipulation based upon the injury stipulation and describing how the fantasy player is to be compensated when the injury occurs to the real player.

20. The non-transitory computer readable medium of claim 14, wherein the receiving comprises: analyzing a news article; and inferring the contract clause based upon the news article.

* * * * *

UNITED STATES PATENT AND TRADEMARK OFFICE
CERTIFICATE OF CORRECTION

PATENT NO. : 8,678,930 B2  
APPLICATION NO. : 13/224870  
DATED : March 25, 2014  
INVENTOR(S) : Paul Gabrail et al.

Page 1 of 1

It is certified that error appears in the above-identified patent and that said Letters Patent is hereby corrected as shown below:

IN THE CLAIMS:

Column 21, line 35, please delete "applying" and insert --method--

Column 21, line 36, please delete "method" and insert --applying--

Column 22, line 30, please delete "member"

Signed and Sealed this
Thirteenth Day of January, 2015

Michelle K. Lee
*Deputy Director of the United States Patent and Trademark Office*